(12) United States Patent
Forst

(10) Patent No.: US 6,497,020 B2
(45) Date of Patent: Dec. 24, 2002

(54) TOOL SUPPORT AND TOOL ASSEMBLY FOR TOOL HOLDERS OF ROTATIONALLY DRIVEN TOOLS

(75) Inventor: Heinz Forst, Aichwald (DE)

(73) Assignee: Traub Drehmaschinen GmbH, Reichenbach (DE)

( * ) Notice: Subject to any disclaimer, the term of this patent is extended or adjusted under 35 U.S.C. 154(b) by 0 days.

(21) Appl. No.: 09/751,909

(22) Filed: Dec. 27, 2000

(65) Prior Publication Data

US 2002/0029447 A1 Mar. 14, 2002

Related U.S. Application Data

(63) Continuation of application No. PCT/EP00/03719, filed on Apr. 26, 2000.

(30) Foreign Application Priority Data

Apr. 28, 1999 (DE) .......................................... 199 19 238

(51) Int. Cl.$^7$ .......................... B32Q 16/10; B23B 29/24
(52) U.S. Cl. .......................................... 29/40; 74/813 L
(58) Field of Search .......................... 29/40, 39, 38 A, 29/38 B; 408/5; 409/211, 201, 216, 192, 203, 217; 74/813 R

(56) References Cited

U.S. PATENT DOCUMENTS

| 2,682,698 A | * | 7/1954 | Berthiez | 29/40 |
| 4,118,844 A | * | 10/1978 | Matsuzaki et al. | 29/26 A |
| 4,164,879 A | * | 8/1979 | Martin | 407/11 |
| 4,828,049 A | | 5/1989 | Preis | 173/163 |
| 4,872,244 A | * | 10/1989 | Schleich | 29/40 |
| 5,007,151 A | * | 4/1991 | Gusching | 29/27 C |
| 5,178,040 A | * | 1/1993 | Schmidt | 74/813 L |
| 5,281,061 A | * | 1/1994 | Ueda et al. | 408/126 |

FOREIGN PATENT DOCUMENTS

| DE | 11 60 711 | 1/1964 |
| EP | 0 764 499 | 3/1997 |
| EP | 0 799 663 | 10/1997 |

* cited by examiner

*Primary Examiner*—William Briggs
(74) *Attorney, Agent, or Firm*—Barry R. Lipsitz

(57) ABSTRACT

In order to improve a tool support for tool holders of rotationally driven tools which can be driven via a gear wheel arranged on one side of the tool holder and mounted for rotation about a gear wheel axis, comprising a receiving means provided on the tool support for at least one tool holder and a first toothed ring provided on the tool support it is suggested that a second toothed ring movable about the toothed ring axis so as to turn on a second path be provided on the tool support, that the second path have a second area of engagement nearest to the gear wheel axis for a gear wheel on the tool holder side, this area of engagement extending at a greater radial distance from the gear wheel axis that the first area of engagement and being located closer to the tool holder in the direction of the gear wheel axis than the first area of engagement.

21 Claims, 7 Drawing Sheets

TOOL SUPPORT AND TOOL ASSEMBLY FOR TOOL HOLDERS OF ROTATIONALLY DRIVEN TOOLS

The invention relates to a tool support for tool holders of rotationally driven tools which can be driven via a gear wheel arranged on one side of the tool holder and mounted for rotation about a gear wheel axis, comprising a receiving means provided on the tool support for at least one tool holder and a first toothed ring provided on the tool support and movable about a toothed ring axis so as to turn on a first path, wherein the first path has a first area of engagement nearest to the gear wheel axis for the gear wheel on the tool holder side.

Tool supports of this type are known from EP 0 799 663; with them the gear wheel of the tool holder is driven via a toothed ring arranged in the tool support.

As a result, there is no possibility with respect to the gear unit formed by the toothed ring and the gear wheel of adapting the transmission ratios in the case of different rotational speeds and torques.

For this reason, additional gear units have so far been provided within the tool holder and these were unstable, on the one hand, on account of the constructional size available and, in addition, involved additional flank clearance and thus inaccuracies with respect to the rotary position of the tool.

The object underlying the invention is therefore to improve a tool support of the generic type in such a manner that an adaptation of the transmission ratios can be realized in a simple manner.

This object is accomplished in accordance with the invention, in a tool support of the type described at the outset, in that a second toothed ring movable about the toothed ring axis so as to turn on a second path is provided on the tool support, that the second path has a second area of engagement nearest to the gear wheel axis for a gear wheel on the tool holder side, this area of engagement extending at a greater radial distance from the gear wheel axis than the first area of engagement and being located closer to the tool holder in the direction of the gear wheel axis than the first area of engagement.

A simple possibility is created with the inventive solution of making various transmission ratios available for the drive of the tool holders without the number of gear wheels required being increased.

In addition, this solution is extremely stable since a constructional space is available for the gear wheel on the tool side and the toothed rings which is greater than the constructional space available in a tool holder.

In principle, it would be conceivable to drive the first toothed ring and the second toothed ring by means of separate drives and thus create additional possibilities for variation with respect to the drive of the tool.

It has, however, proven to be particularly favorable with a view to a simple and stable solution when the first toothed ring and the second toothed ring can be driven by the same drive.

It is simplest from a constructional point of view and sufficient for operation when the first toothed ring and the second toothed ring are arranged on a drive wheel unit driven uniformly so that the two toothed rings rotate together. This simplifies, in particular, the provision of bearings for the toothed rings which can both therefore be mounted via a common bearing.

It has proven to be particularly favorable in this respect when the drive wheel unit is seated on a common shaft and mounted in the tool support via this.

A particularly simple construction of such a drive unit provides for the drive wheel unit to comprise two drive gear wheels connected to one another, wherein each one of the drive gear wheels bears one of the toothed rings.

One possibility of arranging the first and the second toothed rings and the gear wheels on the tool holder side is for the gear wheel axis to extend transversely to the toothed ring axis.

With respect to the design of the drive gear wheels and the gear wheels on the tool holder side, no further details have so far been given. It would, in principle, be conceivable to use bevel gears.

One expedient solution does, however, provide for at least one toothed ring to be designed as a toothed ring of a crown wheel and the corresponding gear wheel on the tool holder side as a cylindrical pinion. This solution has the advantage that such a cylindrical pinion is positionally unsusceptible with respect to its relative position in a radial direction to the crown wheel, as a result of which all the tolerance problems with respect to the radial position of its gear wheel determined by the tool holder can be avoided in a simple manner.

It is particularly favorable when both toothed rings are designed as a toothed ring of a crown wheel and the respectively corresponding gear wheels on the tool holder side as cylindrical pinions.

A further possibility for arranging the gear wheels and the toothed rings is for the gear wheel axis to extend parallel to the toothed ring axis.

In this case, it is preferably provided for the toothed rings to be designed as toothed rings of spur wheels and for the gear wheels on the tool holder side to be cylindrical pinions.

One advantageous variation provides for the first toothed ring and the second toothed ring to have the same number of teeth but different moduli so that, as a result, it is possible to select transmission ratios in a simple manner in accordance with the size of the gear wheels on the tool holder side.

In principle, an inventive tool support could be designed such that it has one receiving means for a tool holder. It is, however, particularly advantageous when the inventive tool support has at least two receiving means for tool holders and for not only the first toothed ring but also the second toothed ring to be arranged in the tool support such that with them a drive of a first and second gear wheel, respectively, of a tool holder arranged in the first receiving means and/or of a tool holder arranged in the second receiving means can be realized.

It is particularly favorable when the receiving means for the tool holders have such a distance from one another that the second gear wheels on tool holders arranged in both receiving means are rotatable free from collision.

A particularly advantageous solution of an inventive tool support provides for this to have a plurality of receiving means for tool holders arranged in azimuthal direction around the toothed ring axis.

In addition, the invention relates to a tool assembly for rotationally driven tools of machine tools, comprising a tool holder for the rotationally driven tool with a tool holder housing, in which a tool spindle is rotatably mounted which can be driven by a gear wheel on the tool holder side, this gear wheel being arranged on one side of the tool holder housing and mounted for rotation about a gear wheel axis, wherein, in accordance with the invention, the tool support is designed in accordance with any one of the preceding embodiments.

The advantage of the inventive solution is thus the same as that explained in conjunction with the inventive tool support.

With respect to the type of drive for the tool holders, different solutions are conceivable. For example, it would be conceivable to drive two gear wheels on the tool holder side with the two toothed rings and thus also have the possibility of using different rotational speeds at the tool holder.

One solution which is particularly advantageous with respect to the simplicity and operational safety provides for the tool holder either to be provided with a first gear wheel which can be brought into engagement with the first toothed ring or to be provided with a second gear wheel which can be brought into engagement with the second toothed ring so that different transmissions for the drive of the tool spindle can be realized depending on the provision of a first or a second gear wheel on the tool holder.

A particularly advantageous solution provides for the gear wheels arranged on the tool holder to be interchangeable with one another so that a first gear wheel can be interchanged for a second gear wheel and a second gear wheel for a first gear wheel so that an adaptation to the desired transmission ratio for the drive of the tool spindle is possible by changing the gear wheels dependent on the particular use.

This can preferably be realized in that not only the first gear wheel but also the second gear wheel can be fixed interchangeably on a tool drive shaft coupled to the tool spindle.

The inventive solution may then be utilized particularly favorably when the tool drive shaft is provided at its end facing away from the tool holder with a coolant supply connection which is connected to a connection receiving means arranged on the tool support when a tool holder is fixed in the receiving means.

A particularly favorable solution provides for the coolant supply connection to be designed as a coolant transfer pin and thus to be rotatable in a simple manner with the tool shaft in relation to the coolant connection receiving means whereas the coolant connection receiving means is arranged so as to be stationary.

In principle it would be conceivable for the tool drive shaft to drive the tool spindle in the tool holder via an additional gear element. A particularly favorable solution does, however, provide for the tool drive shaft to be arranged coaxially to the tool spindle.

It is preferably provided, in particular, with such a solution for the tool drive shaft and the tool spindle to be penetrated by a common coolant channel which leads from the coolant supply connection to the tool.

Additional features and advantages of the invention are the subject matter of the following description as well as the drawings illustrating several embodiments of the invention.

Figure 1:
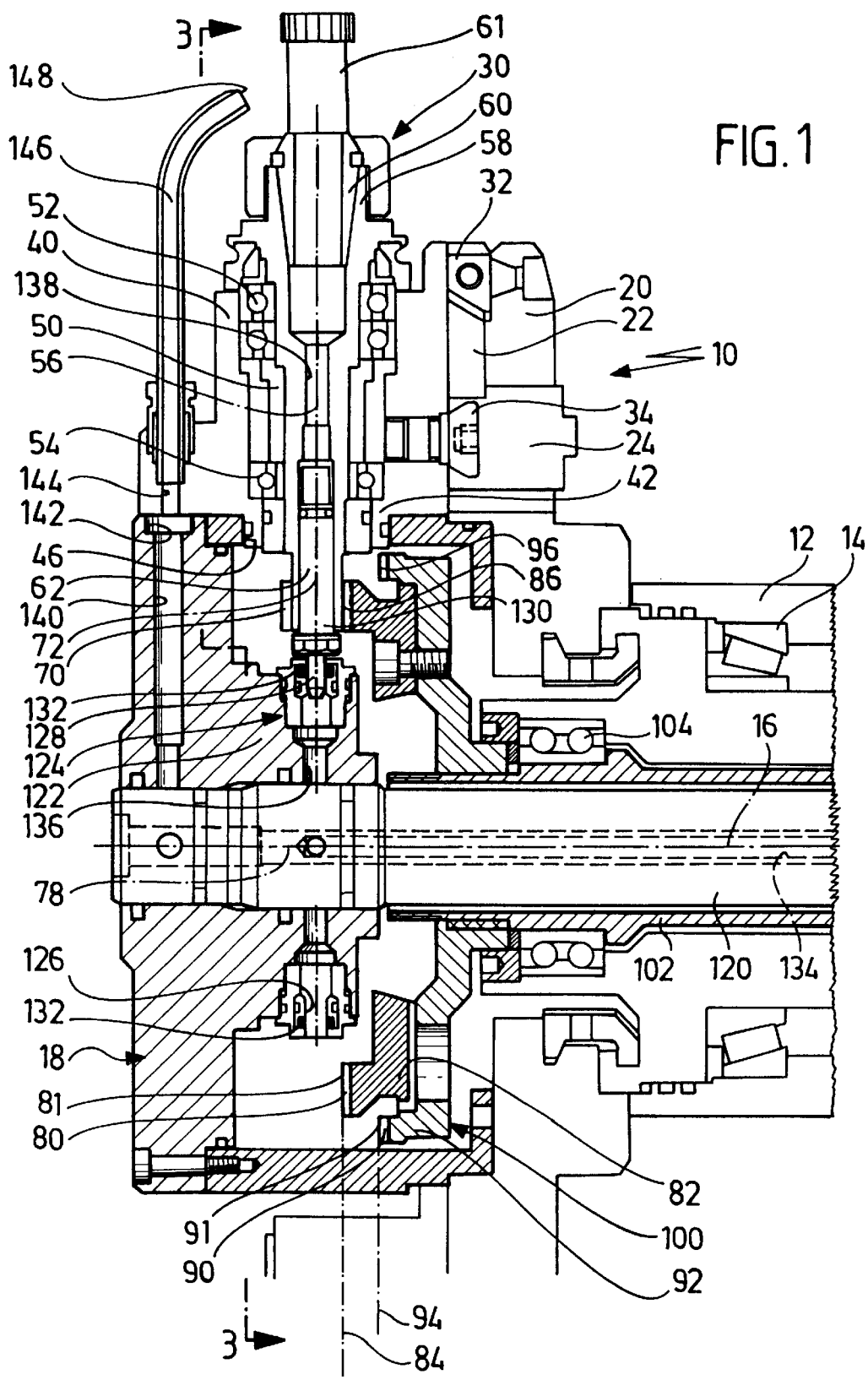
FIG. 1 shows a section through a first embodiment of an inventive tool assembly, comprising a tool holder and a tool support, wherein the tool holder is driven with a first transmission ratio.

A first embodiment of an inventive tool assembly comprises a tool turret which is designated as a whole as 10 and is mounted on a turret receiving means 12 by means of a rotary bearing 14 for rotation about a turret axis 16.

The tool turret 10, which represents a tool support, comprises as tool support housing a turret housing 18 which has a carrier disk 20 with tool holder receiving means 22 and 24, to which tool holders 30 can be fixed with holding elements 32 and 34. Each of the tool holders 30 comprises a tool holder housing 40 which, on the one hand, bears the holding elements 32 and 34 for fixing the same on the carrier disk 20 and, on the other hand, has at an end facing the turret housing 18 a housing attachment 42 which can be inserted in an insert direction 44 extending radially to the turret axis 16 into an opening 46 which is arranged in a casing 48 of the turret housing 18 extending cylindrically around the turret axis 16.

A tool spindle designated as a whole as 50 is mounted in the tool holder housing 40 by means of front spindle bearings 52 and a rear spindle bearing 54 so as to be rotatable about a spindle axis 56. The tool spindle 50 has a tool receiving means 60 for a rotationally drivable tool 61 at its front end 58 facing away from the turret housing 18, wherein the tool receiving means 60 represents, for example, a conical receiving means.

The tool spindle 50 is, in addition, connected to a tool drive shaft 62 which extends from the spindle, for example, proceeding from the rear spindle bearing 54 in the direction of the turret axis 16 and, in the case of the tool holder 30 illustrated in FIG. 1, is provided with a first gear wheel 70 on the tool holder side which is rotatable about a gear wheel axis 72 coaxial to the spindle axis 56 in order to drive the tool spindle 50 via the tool drive shaft 62.

In order to drive the first gear wheel 70, a first toothed ring 80 is provided in the turret housing 18 and this toothed ring is movable on a path 81 about a toothed ring axis 78 coaxial to the turret axis 16 and is designed such that it drives the first gear wheel 70 designed as a cylindrical pinion. The first toothed ring 80 is preferably designed as a toothed ring of a first crown wheel 82 which is arranged so as to rotate about the toothed ring axis 78 so that the path 81, on which the toothed ring 80 moves, is located in a plane 84 which extends parallel to the gear wheel axis 72 and has an area of engagement 86, in which the toothed ring 80 is in engagement with the first gear wheel 70.

The first crown wheel 82 is securely connected to a second crown wheel 92 which bears a second toothed ring 90 which moves on a path 91 which likewise extends coaxially to the toothed ring axis 78 and extends in a second plane 94 which is parallel to the gear wheel axis 70 but extends at a greater distance from the gear wheel axis 70 than the first plane 84. In addition, the path 91 of the second toothed ring 90 extends with respect to the toothed wheel axis 78 radially outside the path 81 of the first toothed wheel 80 and thus has an area of engagement 96 for a second gear wheel arranged coaxially to the gear wheel axis 72 and seated on the tool drive shaft 62 which is arranged so as to be offset in the direction of the tool holder 30 in relation to the area of engagement 86 of the first toothed ring 80 with the first gear wheel 70.

The first crown wheel 82 and the second crown wheel 92 preferably form a drive wheel unit 100 which can be driven via a hollow shaft 102 which is arranged coaxially to the turret axis 16 and, for its part, is arranged in the turret housing 18 by means of a bearing 104 so as to be rotatable.

Figure 2:
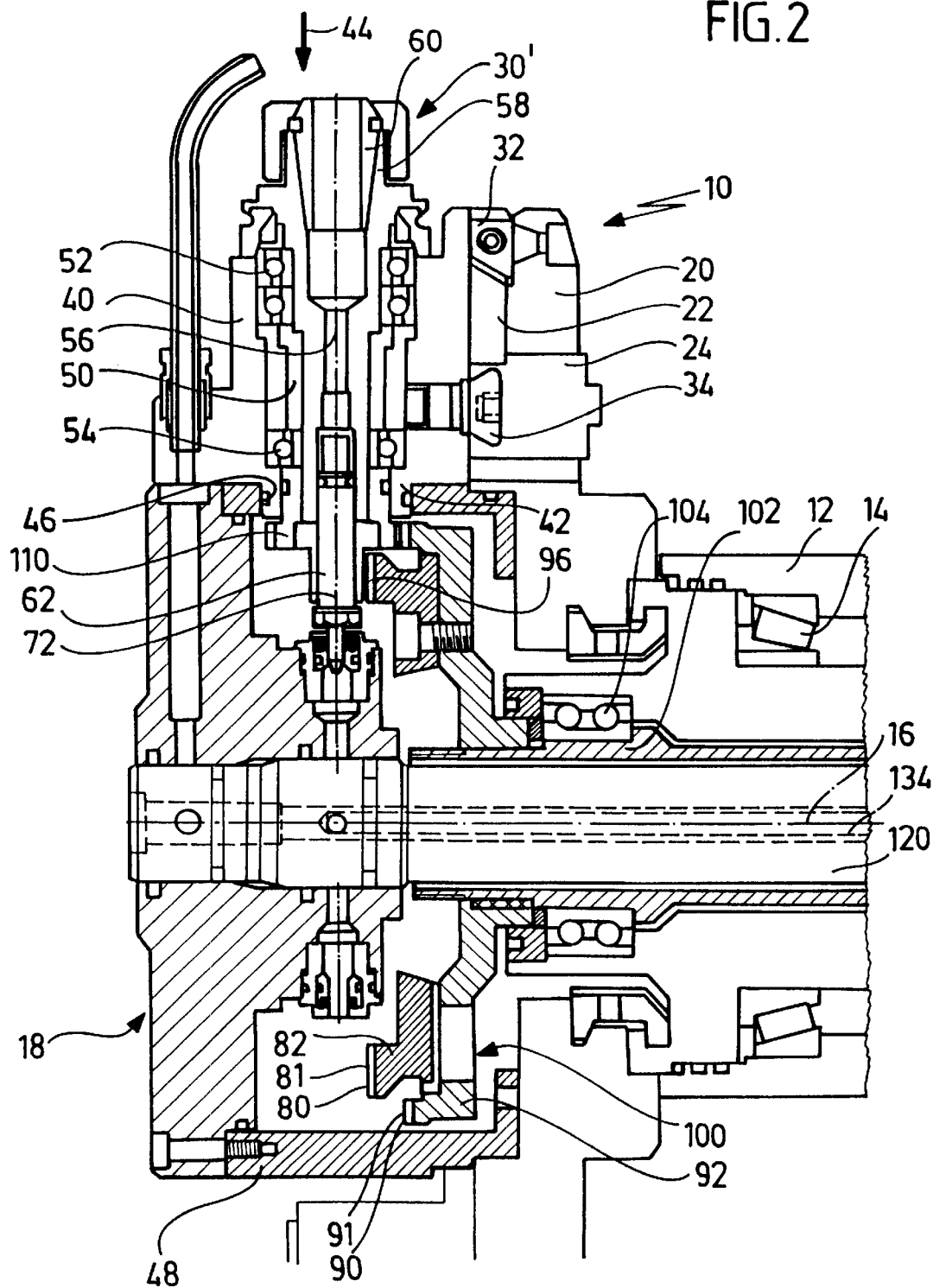
FIG. 2 shows a section corresponding to FIG. 1, wherein the tool holder is driven with a second transmission ratio.

If, as illustrated in FIG. 2, a tool holder 30' is used instead of the tool holder 30 and this bears a second gear wheel 110 which is designed as a cylindrical pinion and is designed and arranged such that it is in engagement with the second toothed ring 90 in its area of engagement 96 and replaces the first gear wheel 70, the tool drive shaft 62 is driven via the second toothed ring 90 of the second crown wheel 92 and the second gear wheel 110 instead of the tool drive shaft 62 in the case of the tool holder 30 illustrated in FIG. 1 being driven via the first toothed ring 80 and the first gear wheel 70.

The first toothed ring 80 and the second toothed ring 90 are preferably designed such that they have the same number of teeth but differ with respect to their modulus, wherein the transmission ratio for the drive of the tool drive shaft 62 via the first toothed ring 80 and the first gear wheel 70 is greater by a factor of 2 than the transmission ratio for the drive of the tool drive shaft 62 via the second toothed ring 90 and the second gear wheel 110.

Figure 3:
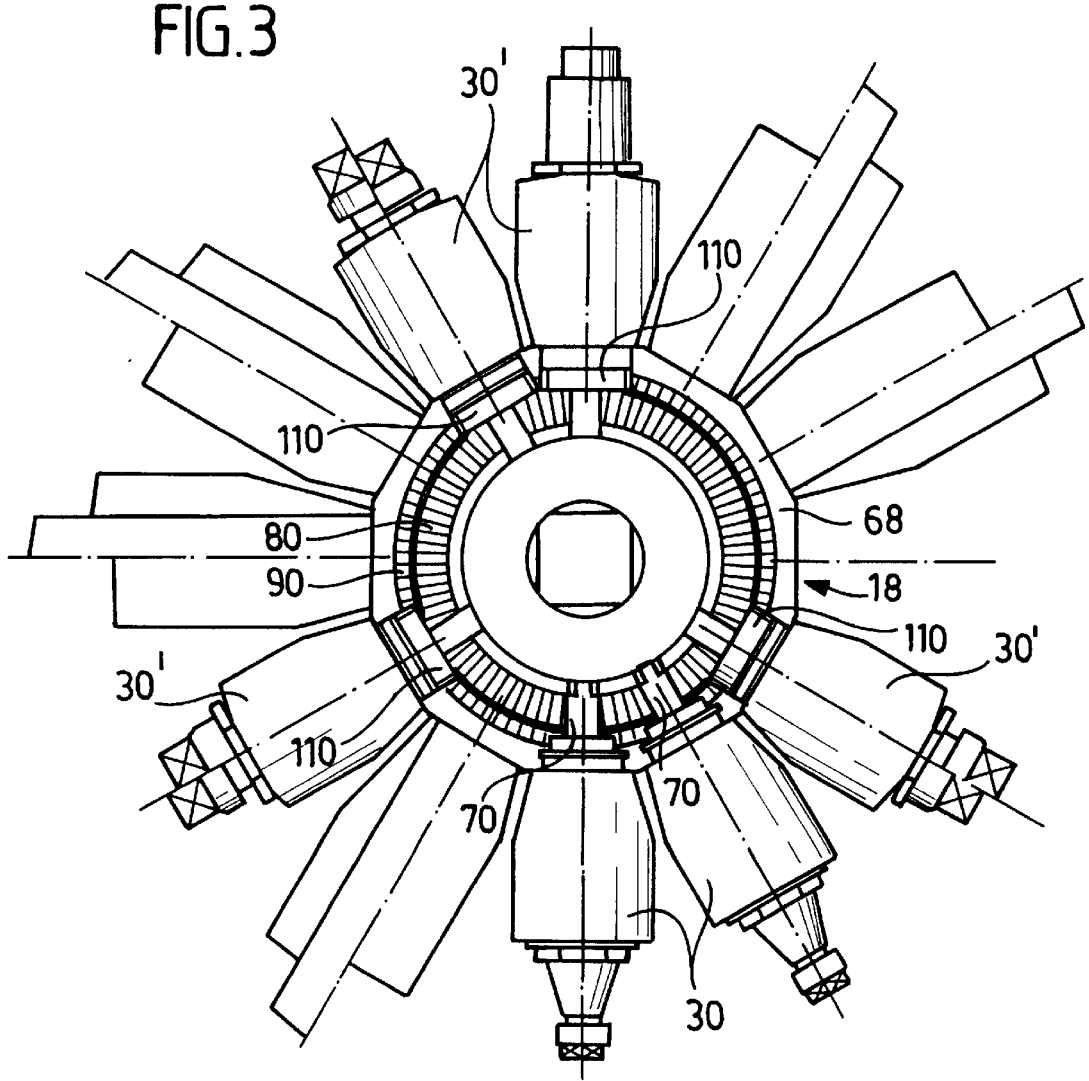
FIG. 3 shows a section along line 3—3 in FIG. 1.

The turret 10 is, in addition,—as illustrated in FIG. 3—designed such that the turret housing 18 has openings which are arranged so as to follow one another in azimuthal direction in relation to the turret axis 16 and into which tool holders 30 or 30' can be inserted, wherein each tool holder 30 or 30' can be provided either with a first gear wheel 70 or a second gear wheel 110 which can be brought into engagement either with the first toothed ring 80 or with the second toothed ring 90 so that a drive of the drive wheel unit 100 via the hollow shaft 102 leads at the same time to a drive of all the tool spindles 50 in all the tool holders 30 or 30'.

In this respect, the azimuthal distances between the tool holders 30 or 30' are selected such that the first gear wheels 70 or the second gear wheels 110 thereof can be brought into engagement with the first toothed ring 80 or the second toothed ring 90 in the turret housing 18 without any interference.

Furthermore, the tool drive shaft 62 of the tool holders 30 or 30'0 is preferably designed such that the gear wheel 70 or 110 can be mounted on this so as to be interchangeable so that the transmission ratio for the drive of the tool spindle 50 and thus of the tool 61 can be selected between the two transmission ratios dependent on the use by interchanging the respective gear wheel.

Figure 4:
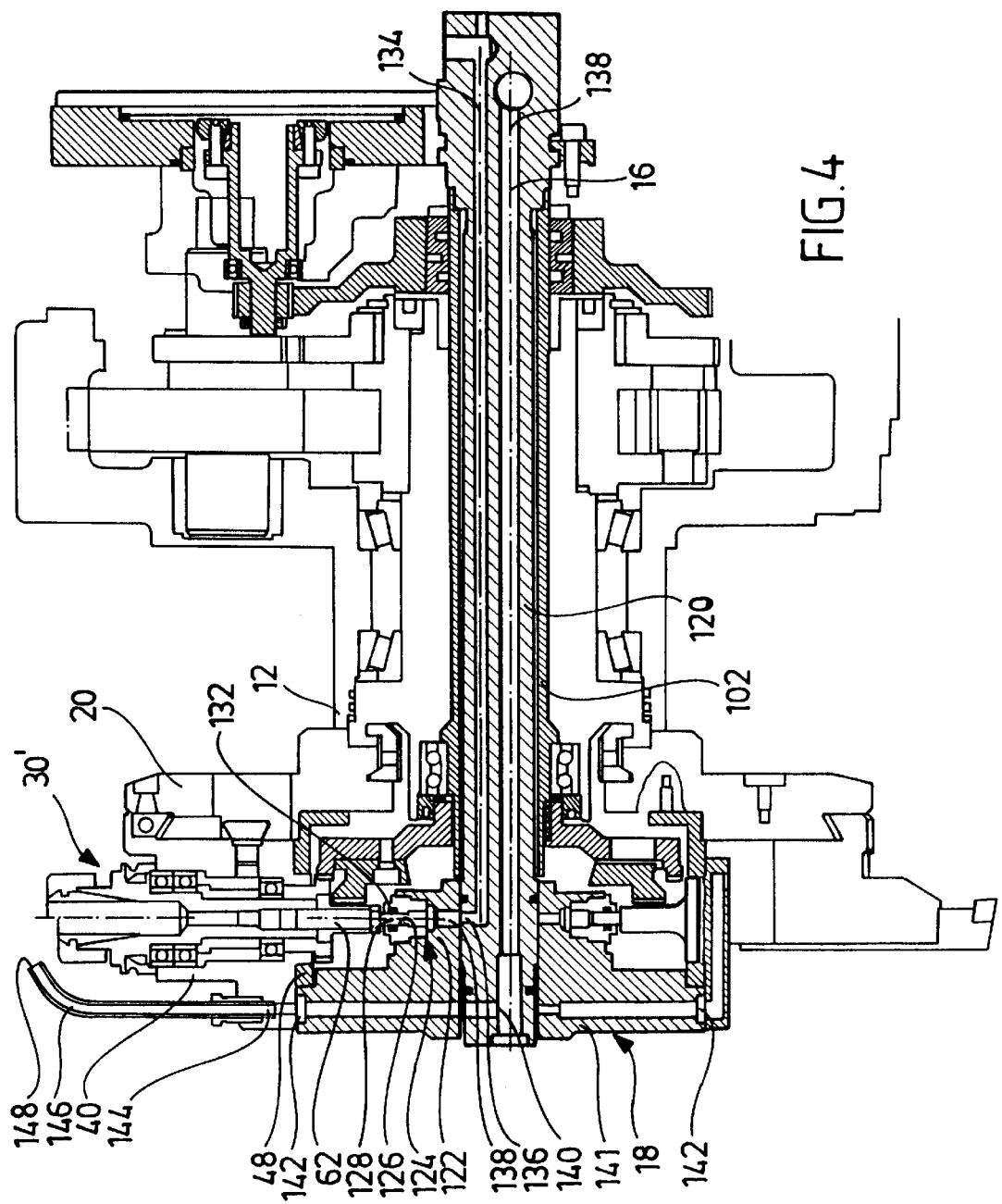
FIG. 4 shows a section similar to FIG. 1 through the tool support and a tool support receiving means in the first embodiment.

As illustrated in FIGS. 1, 2 and 4, a supply pipe 120 is preferably provided within the hollow shaft 102 for the supply of coolant and this extends, proceeding from the turret receiving means 12, through the hollow shaft 102 and beyond this and is thereby connected to a connection member 122 which bears a number of coolant connection units 124 corresponding to the number of the possible tool holders 30 or 30' in the turret 10. These coolant connection units are arranged stationarily in the turret housing 18 and have connection receiving means 126 for a coolant transfer pin 128 extending in a radial direction in relation to the turret axis 16 and coaxially to the gear wheel axis 72, the coolant transfer pin being arranged on an end 130 of the respective tool drive shaft 62 facing the connection member 122.

The coolant transfer pins 128 are preferably sealed on their circumferential side by a circular seal 132 provided in the connection receiving means 126.

For the supply of coolant to the coolant connection units 124, the supply pipe 120 is provided with a supply channel 134, from which a transverse channel 136 branches off which leads via a ring channel 138 to the respective connection receiving means 126 for the respective coolant transfer pins 128. Furthermore, a coolant channel 138 leads from the respective coolant transfer pin 128 through the tool drive shaft 62 and also leads through the spindle 50 as far as the tool receiving means 60, via which the coolant then enters the tool.

In addition, a lubricant supply means guided to the respective tool holder housing 40 can also be supplied by means of an additional supply channel 138 in the supply pipe 120 and this lubricant supply means has transverse channels 140 which branch off from the supply channel 138 and extend in a front plate 141 of the turret housing 18. The openings 142 of these transverse channels are located in the casing 48 of the turret housing 18 and connected to the channels is a lubricant channel 144 which extends in the tool holder housing 40 and merges into a lubricant supply pipe 146, the opening 148 of which, designed, for example, as a spray head, is arranged so as to face a tool 61 to be inserted.

Figure 5:
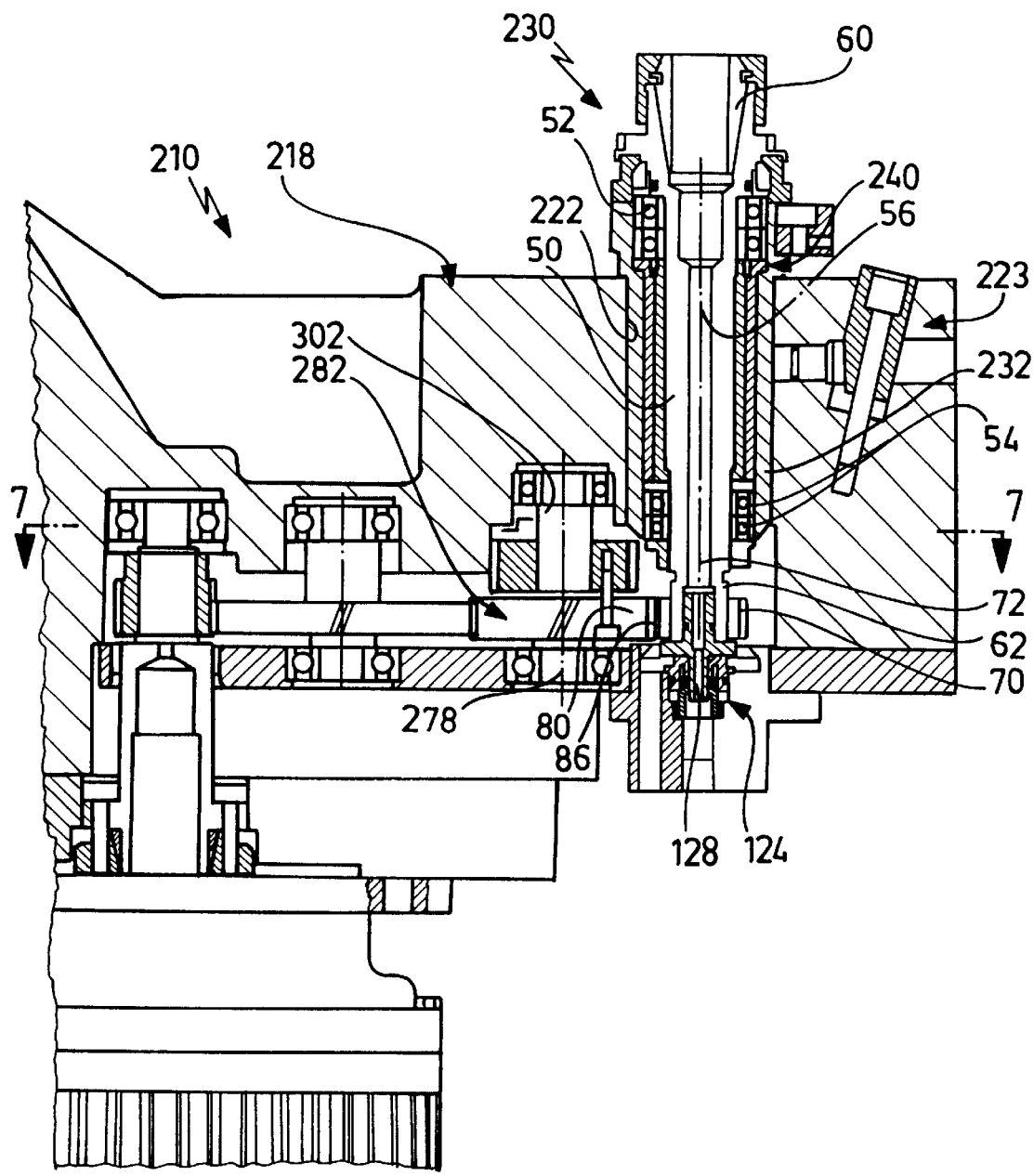
FIG. 5 shows a section through a second embodiment of an inventive tool assembly, wherein the tool holder is driven with the first transmission ratio.
Figure 6:
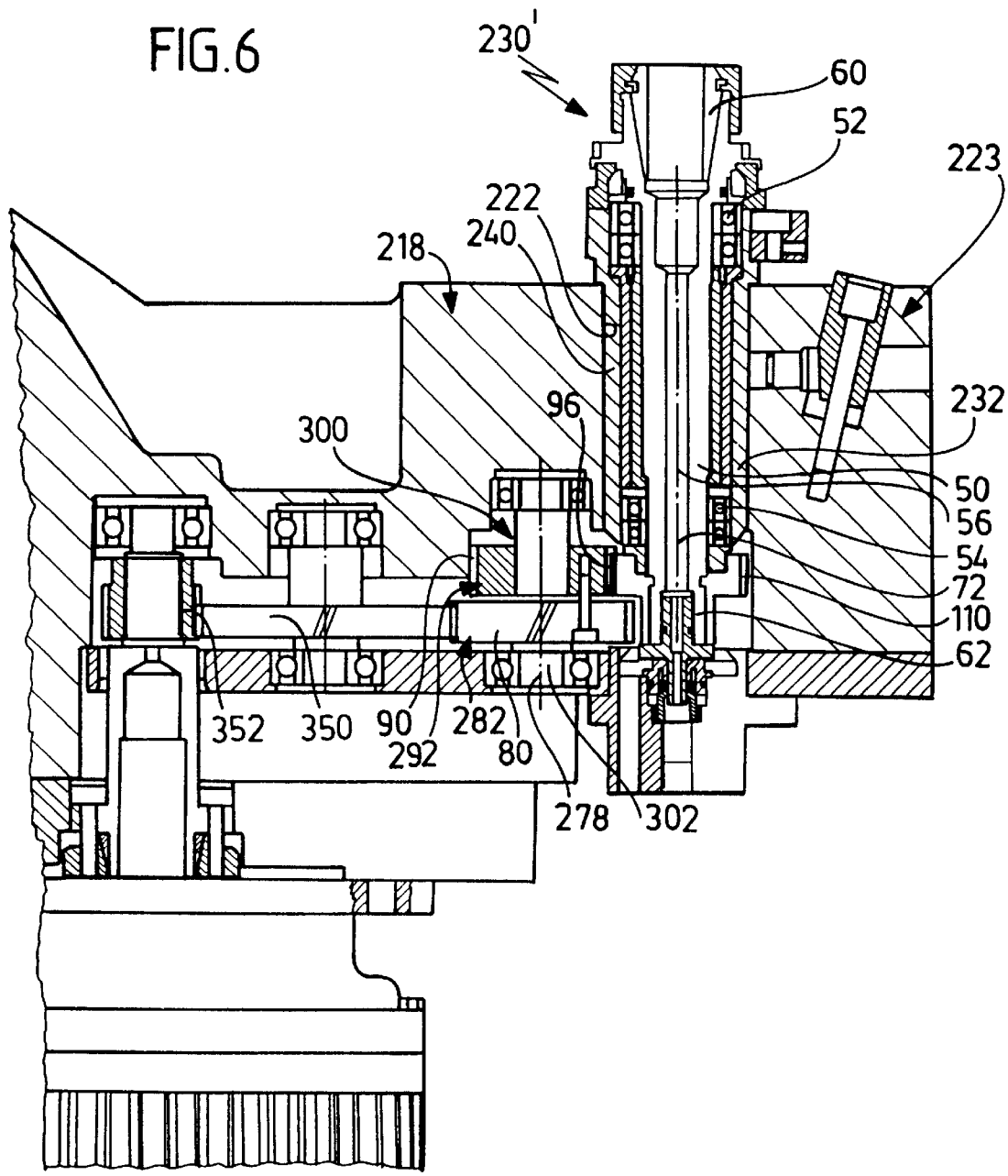
FIG. 6 shows a section corresponding to FIG. 5 of the second embodiment, wherein the tool holder is driven with the second transmission ratio
Figure 7:
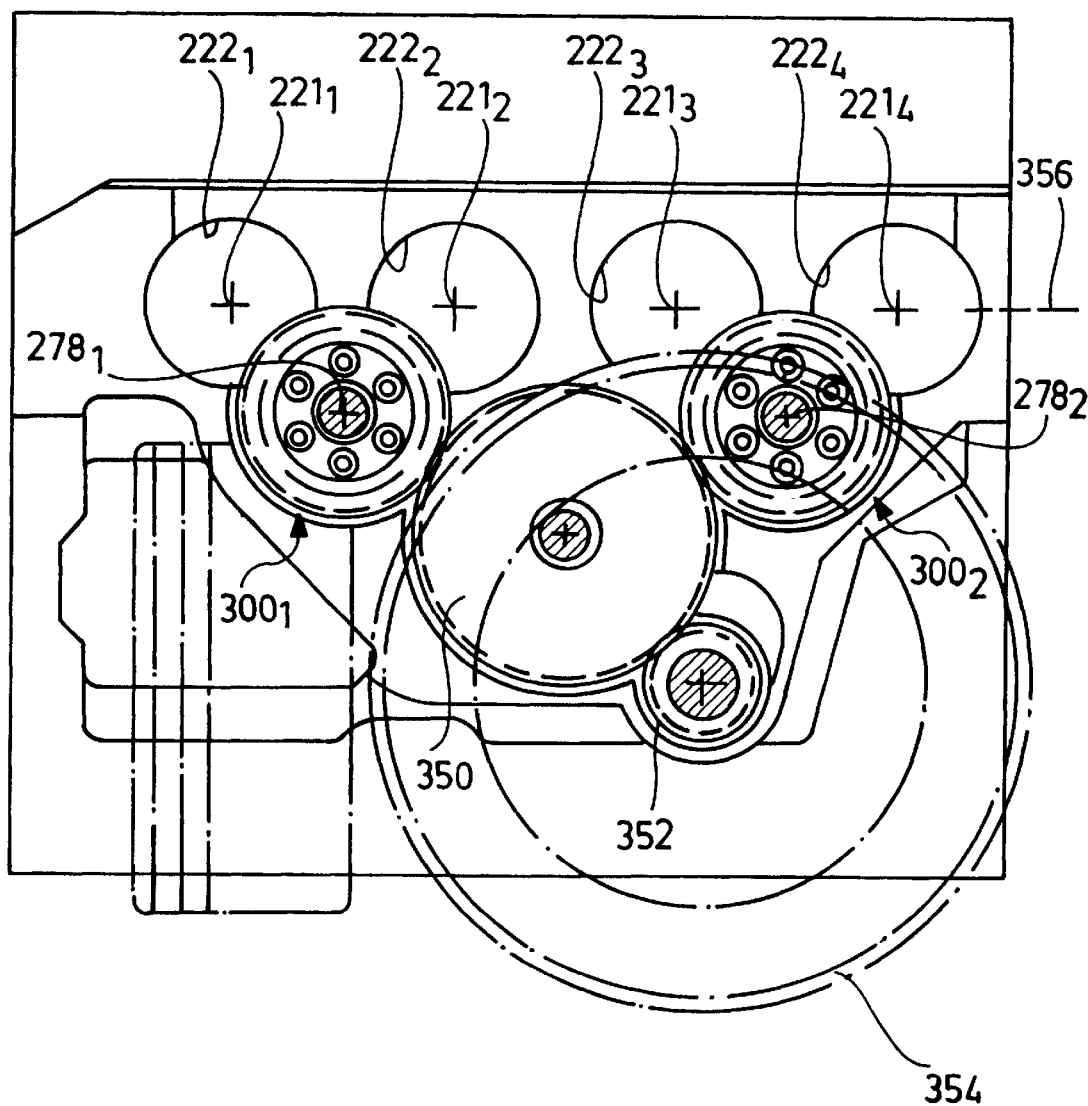
FIG. 7 shows a section along line 7—7 in FIG. 5.

In a second embodiment of an inventive tool assembly, illustrated in FIGS. 5 to 7, a drilling apparatus 210 represents the tool support and its housing 218 forms the tool support housing which is arranged, for example, either stationarily on a machine tool or on a slide of a machine tool.

The tool support housing 18 is, for its part, provided with a tool holder receiving means 222 which is designed as a bore in the tool support housing 218.

A tool holder 230 can be inserted into this tool holder receiving means 222 with a shaft area 232 of its tool holder housing 240 and, for example, be fixed by means of a fixing device 223.

A tool spindle 50 is likewise arranged in the tool holder housing 240 and this is mounted in the tool holder housing 240 in a front spindle bearing 52 and a rear spindle bearing 54 so as to be rotatable about the tool spindle axis 56.

In continuation of the tool spindle 50 beyond the rear spindle bearing 54, the tool drive shaft 62 is provided, in addition, on a side of the tool spindle 50 located opposite the tool receiving means 60 and, in the case of the tool holder 230, bears the first gear wheel 70 which is rotatable about the gear wheel axis 72 which is arranged coaxially to the spindle axis 56.

This first gear wheel 70 is, when a tool holder 230 is inserted into the tool holder receiving means 222, in engagement with the first toothed ring 80 which is arranged in the tool support housing 218 so as to rotate about a toothed ring axis 278.

Alternatively to the first gear wheel 70, the second gear wheel 110 can, as illustrated in FIG. 6, be placed on the tool drive shaft 62 and be brought into engagement with the second toothed ring 90.

The second toothed ring 90 is also, in the same way as the first toothed ring 80, rotatable about the toothed ring axis 278 which, in this embodiment of the inventive solution, does not, however, extend at right angles to the gear wheel axis 72 but rather parallel to it. For this reason, the first gear wheel 282 bearing the first toothed ring 80 is not designed as a crown wheel but rather as a spur wheel and the gear wheel 292 bearing the second toothed ring 90 is likewise designed as a spur wheel.

Not only the first gear wheel 282 but also the second gear wheel 292 form altogether the drive wheel unit 300 which is mounted in the tool support housing 218 so as to be rotatable on the shaft 302.

In the same way as in the first embodiment, a drive of the tool drive shaft 62 with a different transmission by means of the drive wheel unit 300 is possible alternately depending on whether the tool holder 230 according to FIG. 5 or the tool holder 230' according to FIG. 6 is provided with the first gear wheel 70 or the second gear wheel 110, respectively, wherein the transmission between the first toothed ring 80 and the gear wheel 70 is likewise, in the same way as in the first embodiment, preferably greater by a factor of 2 than between the second toothed ring 90 and the second gear wheel 110.

In contrast to the first embodiment, the drive wheel unit 300 is driven, as illustrated in FIG. 7, via an intermediate wheel 350 which is driven, for its part, via a motor pinion 352 of a drive motor 354.

In the case of the drilling apparatus, a plurality of tool holder receiving means $222_1$ to $222_4$ are preferably provided which are all aligned symmetrically to a plane 356 and parallel to one another with their axes $221_1$ to $221_4$, wherein the axes $221_1$ to $221_4$ have constant distances from one another in the direction of the plane 356.

In order to drive several tool holders 230 or 230', a drive unit is associated each time with two tool holder receiving means $222_1$ and $222_2$ or $222_3$ and $222_4$ located next to one another, namely the drive unit $300_1$ or $300_2$, respectively, which can both be driven together via the intermediate wheel 350.

Therefore, one of the tool holders 230 or 230' with a gear wheel 70 or 110, respectively, can be inserted into each of the tool holder receiving means $221_1$ to $221_4$ and a drive takes place each time via the drive wheel $300_1$ or the drive wheel $300_2$ in accordance with the transmission ratios determined by the gear wheel 70 or 110 used.

In addition, as illustrated in FIGS. 5 and 6, a coolant transfer pin 128 is also provided in the case of the tool holders 230 or 230' and this can be inserted into a receiving means 124 which is provided for each tool holder 230, 230' and, in this case, is provided for each of the tool holder receiving means $222_1$ to $222_4$ in the tool support housing 218.

What is claimed is:

1. A tool support, comprising:
    at least one receiving means provided on the tool support for a tool holder of a rotationally driven tool drivable via a gear wheel arranged on one side of a tool holder and mounted for rotation about a gear wheel axis,
    said gear wheel being one of a first gear wheel adapted to be arranged in a first position and a second gear wheel adapted to be arranged in a second position wherein said second gear wheel in said second position is located closer to the tool holder in the direction of the gear wheel axis than said first gear wheel in said first position,
    a first toothed ring provided on the tool support and movable about a toothed ring axis so as to run on a first path,
    the first path having a first area of engagement nearest to the gear wheel axis for the gear wheel in said first position,
    a second toothed ring provided on the tool support and movable about the toothed ring axis so as to run on a second path, and
    the second path having a second area of engagement nearest to the gear wheel axis for the gear wheel in said second position, said second area of engagement extending at a greater radial distance from the gear wheel axis than the first area of engagement.

2. A tool support as defined in claim 1, wherein the the first toothed ring and the second toothed ring are drivable by the same drive.

3. A tool support as defined in claim 2, wherein the first toothed ring and the second toothed ring are arranged on a uniformly driven drive wheel unit.

4. A tool support as defined in claim 3, wherein the drive wheel unit is seated on a common shaft and mounted in the tool support via the common shaft.

5. A tool support as defined in claim 4, wherein the drive wheel unit comprises two drive gear wheels connected to one another.

6. A tool support as defined in claim 1, wherein the gear wheel axis extends transversely to the toothed ring axis.

7. A tool support as defined in claim 6, wherein at least one toothed ring comprises a toothed ring of a crown wheel and the corresponding gear wheel on the tool holder side comprises a cylindrical pinion.

8. A tool support as defined in claim 7, wherein each toothed ring comprises a toothed ring of a crown wheel and the respectively corresponding gear wheels on the tool holder side each comprise a cylindrical pinion.

9. A tool support as defined in claim 1, wherein the gear wheel axis extends parallel to the toothed ring axis.

10. A tool support as defined in claim 9, wherein the toothed rings comprise toothed rings of spur wheels and the gear wheels on the tool holder side are cylindrical pinions.

11. A tool support as defined in claim 1 comprising at least two receiving means for tool holders, wherein the first and second toothed rings are arranged in the tool support to enable driving of at least one of first and second gear wheels, respectively, of:
    a tool holder arranged in the first receiving means,
    a tool holder arranged in the second receiving means.

12. A tool support as defined in claim 11, wherein the receiving means for the tool holders have such a distance from one another that the second gear wheels of tool holders arranged in both receiving means are rotatable free from collision.

13. A tool support as defined in claim 11, wherein the tool support has a plurality of receiving means for the tool holders arranged in an azimuthal direction around the toothed ring axis.

14. A tool support as defined in claim 11, wherein the tool support has a plurality of tool receiving means located next to one another in a plane.

15. A tool assembly for rotationally driven tools of machine tools, comprising:
    a tool holder, with a tool holder housing, for the rotationally driven tool,
    a tool spindle rotatably mounted in said housing and drivable by a gear wheel on the tool holder side, said gear wheel being arranged on one side of the tool holder housing and mounted for rotation about a gear wheel axis,
    a tool support for said tool holder, said tool support comprising:
        at least one receiving means provided on the tool support for the tool holder drivable via said gear wheel,
        said gear wheel being one of a first gear wheel adapted to be arranged in a first position and a second gear wheel adapted to be arranged in a second position wherein said second gear wheel in said second position is located closer to the tool holder in the direction of the gear wheel axis than said first gear wheel in said first position,
        a first toothed ring provided on the tool support and movable about a toothed ring axis so as to run on a first path,
        the first path having a first area of engagement nearest to the gear wheel axis for the gear wheel in said first position,
        a second toothed ring provided on the tool support and movable about the toothed ring axis so as to run on a second path, and
        the second path having a second area of engagement nearest to the gear wheel axis for the gear wheel in said second position, said second area of engagement extending at a greater radial distance from the gear wheel axis than the first area of engagement.

16. A tool assembly as defined in claim 15, wherein gear wheels arranged on the tool holder are interchangeable with one another.

17. A tool assembly as defined in claim 16, wherein first and second gear wheels are adapted to be fixed interchangeably on a tool drive shaft coupled to the tool spindle.

18. A tool assembly as defined in claim 17, wherein the tool drive shaft is provided at its end facing away from the tool holder with a coolant supply connection connected to a connection receiving means arranged on the tool supported when a tool holder is fixed in the receiving means.

19. A tool assembly as defined in claim 18, wherein the coolant supply connection is designed as a coolant transfer pin and is accommodated rotationally in the coolant connection receiving means.

20. A tool assembly as defined in claim 17, wherein the tool drive shaft is arranged coaxially to the tool spindle.

21. A tool assembly as defined in claim 20, wherein the tool drive shaft and the tool spindle are penetrated by a common coolant channel leading from the coolant supply connection to the tool.

* * * * *